United States Patent Office 3,476,743
Patented Nov. 4, 1969

3,476,743
6-ISOTHIAZOLYLACETAMIDO PENICILLANIC ACIDS
Rintje Raap, Raymond Urgel Lemieux, and Ronald George Micetich, Edmonton, Alberta, Canada, assignors to R & L Molecular Research Ltd., Edmonton, Alberta, Canada, a body corporate of Alberta
No Drawing. Filed June 28, 1965, Ser. No. 467,721
Int. Cl. C07d 99/22; A61k 21/00
U.S. Cl. 260—239.1                                12 Claims This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and, more particularly, relates to 6-isothiazolyl-acetamido penicillanic acids and non-toxic salts thereof.

Antibacterial agents of the penicillin class have proven highly effective in the therapy of infections due to Gram-positive bacteria, but nearly all such penicillins are ineffective against Gram-negative bacteria, e.g., *Salmonella enteritidis* and *Klebsiella pneumoniae*. It is the object of the present invention to provide novel compounds which are effective against both Gram-positive and Gram-negative bacteria. It is a further object of the present invention to provide penicillins active against Gram-positive and Gram-negative bacteria which are efficiently absorbed upon oral administration to man and animals.

The objects of the present invention have been achieved by the provision, according to the present invention, of a compound selected from the group consisting of an acid of the formula (I) 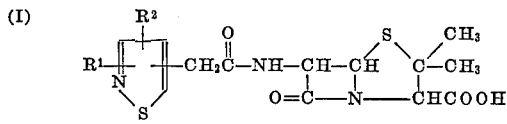

wherein $R^1$ and $R^2$ each represent a member selected from the group consisting of hydrogen, chloro, bromo, iodo and methyl; and the nontoxic pharmaceutically acceptable salts thereof.

Thus, the compounds of the present invention in the form of their free acids have the formulae (II) 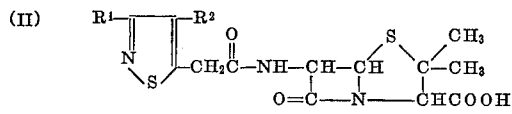

(III) 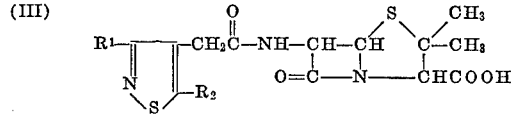

(IV) 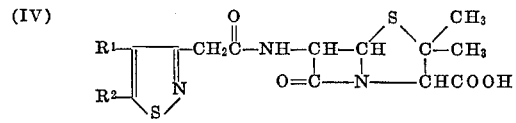

wherein $R^1$ and $R^2$ are as described above.

The preferred embodiments of the present invention are the free acids and the salts thereof of which the free acids have the formula (V) 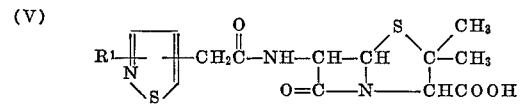

wherein $R^1$ is hydrogen or methyl. When tested in vitro, these compounds exhibited the greatest activity against Gram-negative bacteria.

The nontoxic, pharmaceutically acceptable salts of the acids of Formula I include metallic salts such as sodium, pottasium, calcium and aluminum, the ammonium salt and substituted ammonium salts, e.g. salts of such nontoxic amines as trialkylamines, including triethylamine, procaine, dibenzylamine, N-benzyl-β-phenethylamine, 1-ephenamine, N,N'-dibenzylethylene - diamine, dehydroabietylamine, N,N'-bis-dehydroabietylethylene-diamine, N-(lower)alkylpiperidines, e.g. N-ethylpiperidine, and other amines which have been used to form salts with benzyl-penicillin. Also included within the scope of the present invention are easily hydrolyzed esters and amides which are converted to the free acid form by chemical or enzymatic hydrolysis.

The products of the present invention are prepared by the reaction of 6-aminopenicillanic acid, preferably in the form of a neutral salt such as the sodium salt or the triethylamine salt, with an active ester, e.g. p-nitrophenyl ester or 2,4-dinitrophenyl ester or N-hydroxysuccinimide ester of an acid having the formula (VI) 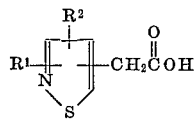

wherein $R^1$ and $R^2$ have the meaning set forth above, or with its functional equivalent as an acylating agent for a primary amino group. Such equivalents include the corresponding carboxylic acid chlorides, bromides, acid anhydrides, including mixed anhydrides and particularly the mixed anhydrides prepared from stronger acids such as the lower aliphatic monoesters of carbonic acid of alkyl and aryl sulfonic acids and of more hindered acids such as diphenylacetic acid. In addition, an acid azide or active thioester (e.g. with thiophenol or thioacetic acid) may be used or the free acid itself may be coupled with 6-aminopenicillanic acid by the use of enzymes or of a carbodiimide reagent [cf. Sheehan and Hess, J. Amer. Chem. Soc. 77, 1067 (1955)], or of an alkynylamine reagent [cf. R. Buijle and H. G. Viehe, Angew. Chem. International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the p-nitrophenyl and 2,4-dinitrophenyl esters is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a corboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a penicilin and the methods used to isolate the penicillins so-produced are well-known in the art.

The novel isothiazolylacetic acids used in the present invention having the formula (VII) 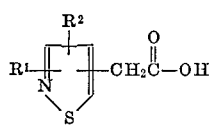

wherein $R^1$ and $R^2$ have the meaning set forth above, are preferably prepared as described and exemplified below from the corresponding isothiazole carboxylic acids or from the corresponding methylisothiazoles. Various isothiazoles, isothiazole carboxylic acids and/or methylisothiazoles and methods for the preparation thereof are described by Caton et al., J. Chem. Soc., 446 (1964); Hubenett et al., Angew Chem., international edition 2, 714 (1963); Buttimore et al., J. Chem. Soc., 2032 (1963); Adams et al., J. Chem. Soc., 3061 (1959); Wille et al., Angew Chem., international edition 1, 335 (1962); Goerdeler et al., Chem. Ber., 94, 2950 (1961); United States Patent No. 2,839,529 and British Patent No. 984,811.

The isothiazolylacetic acids are prepared from the corresponding isothiazole carboxylic acids according to the following reaction scheme:

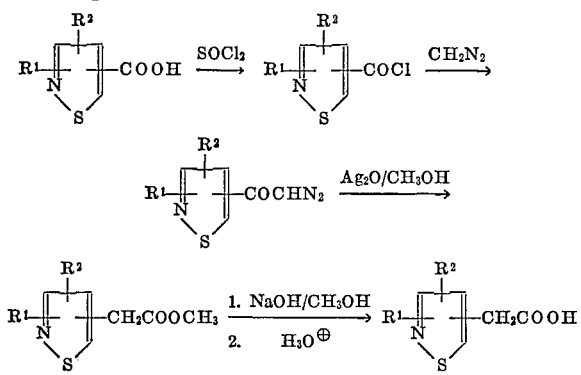

wherein $R^1$ and $R^2$ have the meaning set forth above.

In this process, an isothiazole carboxylic acid is reacted with thionyl chloride preferably at reflux temperature to form the acid chloride. Reaction of the acid chloride with diazomethane solution, e.g., an ethereal solution, preferably at about room temperature gives the diazomethylketone. The diazomethylketone is converted to the acetate by heating with an alcohol, e.g. methanol and ethanol, in the presence of silver oxide. The acetate is hydrolyzed to isothiazolylacetic acid by treating with an alcoholic solution of a strong base, e.g., sodium hydroxide in methanol preferably at room temperature and then acidifying with a strong acid, e.g., hydrochloric acid.

When methylisothiazoles are used to prepare the isothiazolylacetic acids, the reaction scheme is as follows:

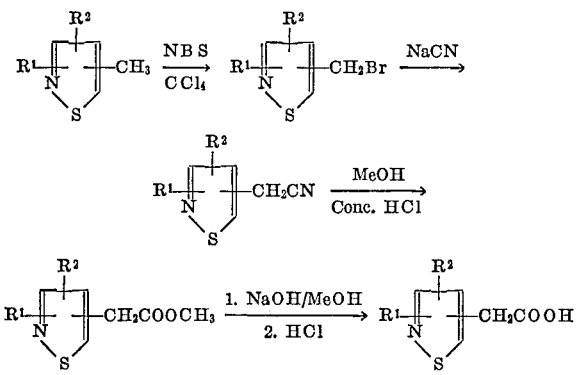

wherein $R^1$ and $R^2$ are each hydrogen, chloro, bromo, or iodo. Obviously where either or both of $R^1$ and $R^2$ is methyl, the first described method should be used.

In this process, a methylisothiazole is halogenated with a halogen radical source, e.g., N-bromosuccinimide or N-chlorosuccinimide, in the presence of a non-reactive solvent such as carbon tetrachloride and preferably at reflux temperature and in the presence of an initiator, e.g., benzoyl peroxide or irradiation to produce a halomethylisothiazole, preferably a bromomethylisothiazole. Treatment of this compound with an alkali metal cyanide in the presence of a solvent, e.g., methanol-water, gives a mixture of the cyanide and the amide. The mixture is heated at reflux temperature with a strong acid, e.g., concentrated hydrochloric acid, and an alcohol, e.g., methanol or ethanol, to form the acetate. Hydrolysis of the acetate by treatment with an alcoholic solution of a strong base, e.g., sodium hydroxide in methanol, preferably at room temperature, followed by acidification with a strong acid., e.g., hydrochloric acid, produces the isothiazole carboxylic acid.

Alternatively, the isothiazolylacetic acids of this invention may be prepared from isothiazole lithium compounds [described by Caton et al., J. Chem. Soc., 446 (1964)] by the various reaction schemes which are described below:

(1) Reaction of isothiazole lithium with formaldehyde to give isothiazolylmethyl alcohol and then treatment with a halo acid, e.g. hydrchloric, hydrobromic or hydriodic, to form a halomethylisothiazole. The subsequent procedure whereby the acid is obtained is identical to that described for the preparation of isothiazole acetic acids from methylisothiazoles.

(2) Ethoxylation of isothiazole lithium with ethylene oxide to give isothiazolylethyl alcohol and subsequent oxidation to the acid.

(3) Reaction of isothiazole lithium with a haloacetate to form an isothiazolylacetate and subsequent hydrolysis to the acid.

(4) Reaction of isothiazole lithium with a dialkoxyethylhalide to form dialkoxyethylisothiazole; acidification with dilute acid to form the aldehyde; followed by oxidation to the acid.

(5) Reaction of isothiazole lithium with allyl halide to form allylisothiazole and then oxidation to the acid.

(6) Reaction of isothiazole lithium with dimethylformamide to give formylisothiazole [reaction described by Caton et al., J. Chem. Soc., 446 (1964)] followed by condensation with rhodanine to give isothiazolylrhodanine. The isothiazolylrhodanine is cleaved with alkali, e.g., sodium hydroxide, to give isothiazolyl α-thioketopropionic acid, which in turn is converted to the oximino acid with ammonium hydroxide. Decarboxylation and dehydration with acetic anhydride produces the cyanomethylisothiazole which is converted to the acid by the procedure described in connection with the preparation of isothiazolylacetic acids from methylisothiazole. This general procedure is described by Plucker, et al., J. Amer. Chem. Soc., 62, 1512 (1940). In the foregoing reaction schemes, instead of the lithium compound, the corresponding Grignard compound, e.g. isothiazole magnesium chloride, bromide or iodide (prepared by reaction of chloro, bromo or iodo isothiazole with magnesium), can be used.

Additional procedures for the preparation of isothiazolylacetic acid are as follows:

(7) Reaction of halomethylisothiazole (preparation described above) with magnesium to form corresponding Grignard compound followed by treatment with carbon dioxide gives the acid.

(8) Conversion of isothiazole carboxylic acid to the acetic acid according to the Arndt-Eistert Synthesis, or treatment of isothiazole carboxylic acid with lithium aluminum hydride to give isothiazolylmethyl alcohol, and subsequent conversion of the alcohol to the acid according to the procedure described in Scheme 7 above.

(9) Reaction of haloisothiazole with sodium dicyanomethane or sodium dialkylmalonate, e.g. sodium diethylmalonate, to give the corresponding dicyanomethylisothiazole or dicarbalkoxymethylisothiazole followed by acid hydrolysis to the acid.

Alternatively, the novel penicillins of this invention may be prepared by growing a Penicillium mold of the group notatum-chysogenum in a culture medium, preferably a submerged culture, in the presence of an effective proportion, suitably less than about 5%, of a precursor having the formula (VIII)

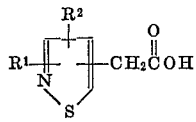

wherein $R^1$ and $R^2$ have th meaning set forth above or the functional equivalent thereof, i.e. derivatives of the compounds of Formula VIII which are transformed into the acetic acid during the course of the fermentation and isolating the penicillin so-produced. Such equivalents have been disclosed in connection with the fermentation of penicillins V and G.

Culture of the medium containing the precursor and the isolation of the new penicillin are conducted according to the methods known in the art, e.g. U.S. Patent Nos. 2,562,410, 2,440,359, 2,854,450 and 3,024,168. The proportion of precursor to be used varies widely. The maximum concentration conveniently is about 5% and the minimum is that necessary to produce a reasonable amount of the novel penicillin. The precursor is ordinarily used in a concentration of about 0.01 to 1.0% and preferably about 0.05 to 0.5%.

The following examples will serve to illustrate this invention without limiting it thereto. All temperatures are in degrees centigrade.

Example 1.—Preparation of isothiazol-3-yl-acetic acid

The synthesis of this acid is illustrated by the following scheme:

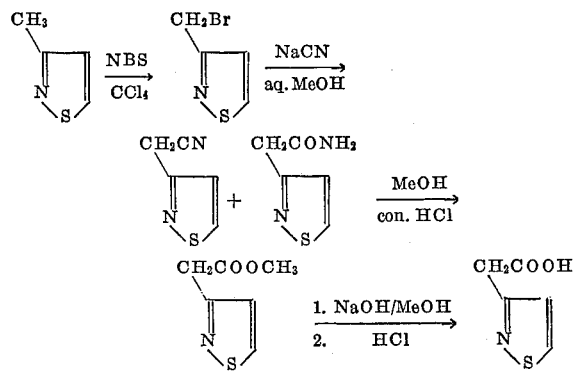

3-bromomethylisothiazole.—3-methylisothiazole (9.9 g., 0.10 mole) and N-bromosuccinimide (18 g., 0.10 mole) in dry carbon tetrachloride (250 ml.) were heated with vigorous stirring under reflux with exposure to a 750 watt lamp for 5–6 hours, at which time all the N-bromosuccinimide had been consumed. Succinimide was removed by filtration and the filtrate was concentrated on a steam bath. The residue was then subjected to fractional distillation in vacuo to give 7 g. (40%) of 3-bromomethylisothiazole, B.P. 58–60° (1.5 mm.).

3 - cyanomethylisothiazole and 3-carboxamidomethylisothiazole.—3-bromomethylisothiazole (22 g., 0.13 mole), sodium cyanide (9.8 g., 0.20 mole), methanol (60 ml.) and water (60 ml.) were heated under reflux for 5–6 hours, during which time the solution had attained a deep red color. After most of the methanol had been removed under reduced pressure the solution was saturated with salt and continuously extracted with ethyl acetate for 24 hours. The ethyl acetate solution was dried over magnesium sulfate and filtered. Removal of the solvent yielded 13.5 g. of a yellow semisolid, a mixture of cyanide and amide as indicated by the infrared spectrum. Separation could be effected by washing with cold benzene, in which the cyanide dissolved and was recovered as an oil (7.0 g.) by removal of the solvent. The amide could be recrystallized from ethyl acetate-hexane to give long white needles (4.1 g.), M.P. 123–127°.

The crude mixture of cyanide and amide could be used as such in the preparation of methyl isothiazol-3-yl-acetate.

Methyl isothiazol-3-yl-acetate.—The mixture of cyanide and amide (16.5 g.) was heated under reflux for 4 hours with concentrated hydrochloric acid (50 ml.) and methanol (100 ml.). The methanol was removed under reduced pressure, the solution saturated with salt and extracted with ether (6× 100 ml.). The combined ether extracts were dried over magnesium sulfate and filtered. The ether was removed and the residue distilled in vacuo to give 13 g. of methyl isothiazol-3-yl-acetate, B.P. 108–110° (6 mm.).

Isothiazol-3-yl-acetic acid.—Methyl isothiazol-3-yl-acetate (12.5 g.) was dissolved in methanol (15 ml.) and a solution of 3 N sodium hydroxide in methanol (30 ml.) was added with swirling. The color of the solution went from yellow to dark red. The solution was left overnight at room temperature and then concentrated in vacuo to a thick red wax. Excess dry ether was added with scratching and the sodium salt separated as fine pink needles. These were filtered, washed with dry ether and dried by suction. The salt was dissolved in ice water (100 ml.) and acidified with concentrated hydrochloric acid (8 ml.). The mixture was saturated with salt and extracted with ethyl acetate (5× 100 ml.). The dried (MgSO$_4$) ethyl acetate extracts were filtered and the solvent was removed. The residue was recrystallized from ethyl acetate-hexane and 8.2 g. (71%) of isothiazol-3-yl-acetic acid was obtained as white needles, M.P. 130–132° (dec.).

The structural assignment of this acid was confirmed by the neutralization equivalent, the infrared spectrum and the nuclear magnetic resonance absorption spectrum.

Example 2.—Preparation of isothiazol-4-yl-acetic acid

The synthesis of this acid is schematically represented by:

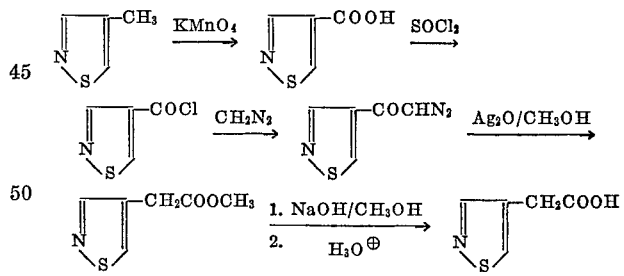

Isothiazole-4-carboxylic acid.—4-methylisothiazole (22 g.), sodium carbonate (72 g.) and water (1 litre) were stirred vigorously and heated under reflux. An aqueous solution of potassium permanganate (300 g. in 2 litres) was added rapidly and the mixture was heated for an additional 20 minutes. The precipitated manganese dioxide was filtered and washed with hot water (4× 100 ml.). The aqueous layer was extracted with ether (3× 200 ml.) and carefully acidified with concentrated sulfuric acid to pH 1. The mixture was saturated with salt and continuously extracted with ether for 48 hours. The ether solution was dried (MgSO$_4$), filtered and the solvent removed under reduced pressure to give 6.0 g. (20%) yield of isothiazole-4-carboxylic acid. A portion was recrystallized from ethyl acetate-hexane and melted at 162–164°.

Isothiazole-4-carbonyl chloride.—Crude isothiazole-4-carboxylic acid (6.0 g.) and thionyl chloride (70 ml.) were heated under reflux for two and one half hours, whereafter the excess of thionyl chloride was removed under reduced pressure. Distillation of the residue in vacuo gave 3 g. (44%) yield of isothiazole-4-carbonyl chloride, B.P. 73–74° (5 mm.).

Isothiazole-4-diazomethylketone.—The acid chloride (3 g.) was added slowly to an ice-cold solution of diazomethane in ether (0.2 M, 300 ml.) and the solution was left at room temperature overnight. Ether and excess diazomethane were removed under reduced pressure and the red-brown residue was recrystallized from benzene-hexane to give 1.9 g. (57%) of fine yellow needles, M.P. 57–59°, with the expected infrared spectrum.

Methyl isothiozol-4-yl-acetate.—The diazoketone (1.9 g.), silver oxide (0.2 g.) and absolute methanol (25 ml.) were heated under reflux. Periodically small portions of silver oxide were added. The extent of the reaction was followed by the disappearance of the diazo band and the emergence of the ester carbonyl band in the infra-red absorption spectrum of the mixture. After 3 hours the reaction was complete and the methanol was removed under reduced pressure. The residue was shaken with dry ether and filtered. The ether filtrate was washed with 2 N hydrochloric acid (10 ml.) and saturated aqueous sodium chloride (2×10 ml.). Next it was dried over magnesium sulfate with decolorizing charcoal. The mixture was filtered and the ether removed. A pale yellow oil (1.4 g.) with the expected infrared absorption spectrum was obtained.

Isothiazol-4-yl-acetic acid.—Methyl isothiazol-4-yl-acetate (1.4 g.) was dissolved in methanol (15 ml.) and a solution of 3 N sodium hydroxide in methanol (3.4 ml.) was added with swirling. The color of the solution went from yellow to dark red. The solution was left overnight at room temperature and then concentrated in vacuo to a thick red wax. Excess dry ether was added with scratching and the sodium salt separated as fine pink needles. These were filtered, washed with dry ether and dried by suction. The salt was dissolved in ice water (15 ml.) and acidified with concentrated hydrochloric acid (1 ml.). The mixture was saturated with salt and extracted with ethyl acetate (5×100 ml.). The dried (MgSO₄) ethyl acetate extracts were filtered and the solvent was removed. The residue was recrystallized from ethyl acetate-hexane and 1.2 g. (94%) yield of isothiazol-4-yl-acetic acid was obtained as white needles, M.P. 117–119° (dec.).

The structural assignment of this acid was confirmed by the neutralization equivalent, the infrared spectrum and the nuclear magnetic resonance absorption spectrum.

Example 3.—Preparation of isothiazol-5-yl-acetic acid

The synthesis of this compound is illustrated by the following scheme:

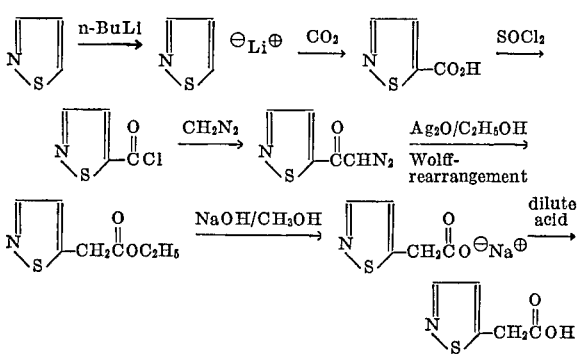

Isothiazole-5-carboxylic acid.—This compound was prepared by reacting isothiazolyllithium with solid carbon dioxide, following the directions of Caton, Jones, Slack and Wooldridge, J. Chem. Soc., 446 (1964). The acid, M.P. 196–200° (dec.) was recrystallized from ethyl acetate and obtained in a 61% yield.

Isothiazole-5-carbonyl chloride.—Isothiazole-5-carboxylic acid (11.8 g., 0.092 mole) and freshly distilled thionyl chloride (50 ml.) were heated under reflux for 1.5 hours. The excess thionyl chloride was removed on a rotary evaporator and the residue distilled in vacuo to give 10.8 g. (80%) of colorless liquid, B.P. 56–58° (5 mm.), with the expected infrared spectrum.

Isothiazole-5-diazomethylketone.—A solution of isothiazole-5-carbonyl chloride (9.4 g., 0.064 mole) in 20 ml. of ether was added dropwise to 455 ml. of a 0.29 molar ethereal diazomethane solution (0.131 mole diazomethane) cooled in ice. A rapid reaction took place as was apparent by the rapid evolution of nitrogen and the color change of the ethereal solution from yellow to reddish-brown. After the addition of the acid chloride was completed (in approximately 30 minutes) the solution was allowed to come to room temperature in 30 minutes. Removal of the ether on a rotary evaporator left a reddish-brown solid residue, which was twice recrystallized from a benzene-petroleum ether mixture to 5.9 g. (60%) of colored crystals, M.P. 75–78°. The infrared spectrum contained a strong band at 2100 cm.$^{-1}$, characteristic for diazocarbonyl compounds.

Ethyl isothiazol-5-yl-acetate.—Isothiazole-5-diazomethylketone (5.7 g., 0.037 mole) and absolute ethanol (35 ml.) were heated under reflux, with magnetic stirring, in a 300 ml. round-bottom flask (the inside of which had been coated with a silver mirror). A small amount (approximately 0.3 g.) of freshly prepared silver oxide was added. This resulted in an immediate evolution of gas. This gas evolution ceased after 10–15 minutes and the addition of some more silver oxide was required. The extent of the reaction could be followed by the disappearance in the infrared spectrum of the diazo band at 2100 cm.$^{-1}$ and the appearance of an ester carbonyl band at 1740 cm.$^{-1}$. The reaction was completed after 2.5 hours heating under reflux, and a total amount of approximately 3.0 g. of silver oxide was added during this reflux period. The ethanol was removed on a rotary evaporator. Ether (100 ml.) was added to the residue and the suspended solid material was filtered off. The intensely red colored ether solution was washed with one N hydrochloric acid (30 ml.), whereafter it was dried over magnesium sulfate with some decolorizing carbon. The mixture was filtered and the ether removed on a rotary evaporator. The residue was distilled in vacuo to give 3.8 g. (60%) of colorless liquid, B.P. 95–96° (2 mm.), with the expected infrared spectrum.

Isothiazol-5-yl-acetic acid.—Eight ml. of 3 N methanolic sodium hydroxide was added to a solution of ethyl isothiazol-5-yl-acetate (3.3 g., 0.019 mole) in methanol (5 ml.). The solution became an intense red color and some heat was evolved. The mixture was left at room temperature for one hour during which the sodium salt of isothiazol-5-yl-acetic acid slowly crystallized from the solution. The remainder of the salt was precipitated by the addition of ether (75 ml.). The somewhat brownish colored salt was filtered off and amounted to 3.2 g. It was dissolved in water (25 ml.) followed by the addition of 3 N aqueous sulfuric acid (10 ml.). Isothiazol-5-yl-acetic acid precipitated immediately and was taken up in ethyl acetate (100 ml.). The aqueous layer was extracted with an additional amount of ethyl acetate (25 ml.). The combined ethyl acetate solutions were dried over magnesium sulfate with some decolorizing carbon. The mixture was filtered and the filtrate was concentrated on a rotary evaporator to a volume of approximately 50 ml., whereafter it was cooled in ice. The product, that crystallized readily from the solution, was collected by filtration. Yield: 2.1 g. (76%) of almost white crystals, M.P. 153–155° (dec.). The neutralization equivalent, the infrared spectrum and the nuclear magnetic resonance spectrum fully agreed with the expected structure.

Example 4.—Preparation of 4-chloroisothiazol-3-yl-acetic acid

The synthesis of this acid is illustrated by the following reaction scheme:

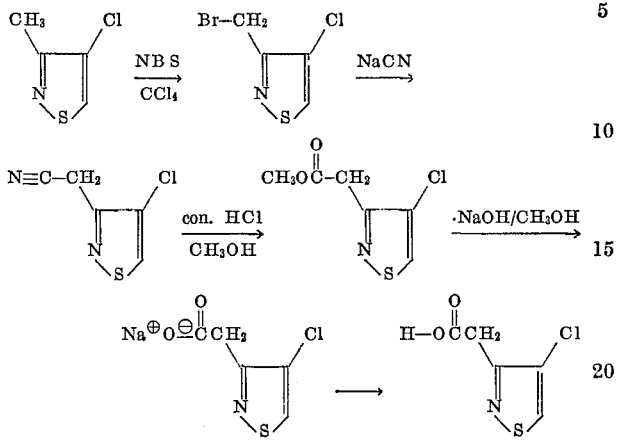

4 - chloro-3-bromomethylisothiazole.—4-chloro-3-methylisothiazole (21.9 g., 0.164 mole), N-bromosuccinimide (29.2 g., 0.164 mole) and benzoyl peroxide (1 g.) in carbon tetrachloride (150 ml.) were heated under reflux with exposure to a 750 watt lamp for 10 hours. The succinimide was filtered off and the solvent removed under reduced pressure. The residue was dissolved in ether and washed with a 5% aqueous sodium bicarbonate solution. The residue obtained after drying and removal of the ether was fractionally distilled in vacuo. There was obtained 16.8 g. (48%) of 4-chloro-3-bromomethylisothiazole, B.P. 67–79° (0.5 mm.).

4 - chloro - 3-cyanomethylisothiazole.—Sodium cyanide (5.6 g., 0.115 mole) was added in portions to a stirred mixture of 4-chloro-3-bromomethylisothiazole (16.7 g., 0.0785 mole) and dimethylsulfoxide (25 ml.). The exothermic reaction necessitated some cooling. When the mixture solidified almost completely, the remaining sodium cyanide was all added at once. An additional 10 ml. of dimethylsulfoxide was added and the mixture was heated in a water bath at 40–50° for 4 hours. The reaction mixture was poured into ice water (100 ml.) and the organic material was extracted with methylene chloride (3× 50 ml.). The combined organic extracts were washed successively with 6 N hydrochloric acid (2×) and 5% aqueous sodium bicarbonate (1×). The methylene chloride solution was dried over magnesium sulfate with decolorizing carbon and filtered to give a red colored filtrate. The solvent was removed and the residue distilled in vacuo to give 6.4 g. of crude product, B.P. 95–107° (1 mm.). This partly solidified material was taken up in ether (10 ml.) followed by the addition of petroleum ether which caused a white solid to precipitate. The mixture was cooled and the solid collected by filtration; yield 3.9 g. (32%); M.P. 38–40°. The infrared spectrum agreed with the expected structure.

Methyl 4-chloroisothiazol-3-yl-acetate.—A mixture of 4-chloro-3-cyanomethylisothiazole (3.5 g., 0.022 mole), methanol (25 ml.) and concentrated hydrochloric acid (15 ml.) was heated under reflux for 18 hours, whereafter most of the methanol was removed on a rotary evaporator. The organic material was taken up in methylene chloride and the aqueous layer once more extracted with some methylene chloride. The combined methylene chloride solutions were dried over magnesium sulfate with some decolorizing carbon, followed by filtration. The solvent was removed and the almost colorless liquid residue distilled in vacuo to give 2.7 g. (65%) of colorless liquid, B.P. 83–88° (0.5 mm.). The infrared spectrum agreed with the expected structure.

4 - chloroisothiazol - 3-yl-acetic acid.—Methyl 4-chloroisothiazol-3-yl-acetate (2.65 g., 0.0133 mole) was dissolved in methanol (6 ml.) and the resulting solution was treated with 3N methanolic sodium hydroxide (7 ml.). The sodium salt of the required acid readily crystallized. The mixture was left at room temperature for one hour, then most of the methanol was removed and ether (75 ml.) was added to the residue. The sodium salt was filtered off and amounted to 2.35 g. (88%). The sodium salt (2.2 g., 0.011 mole) was dissolved in water (30 ml.) and this solution was acidified with 3N aqueous sulfuric acid. The product slowly crystallized from the solution in fine white needles. The mixture was cooled and the crystals collected by filtration. The acid, M.P. 109–110.5°, was finally dried in vacuo over phosphorous pentoxide and amounted to 1.6 g. (72%, based on ester). The infrared spectrum, neutralization equivalent and nuclear magnetic resonance spectrum fully agreed with the expected structure.

Example 5.—Preparation of 4-bromoisothiazol-3-yl-acetic acid 4-bromo-3-bromomethylisothiazol.—4 - bromo - 3 - methylisothiazole (19.9 g., 0.112 mole), N-bromosuccinimide (19.9 g., 0.112 mole) and benzoyl peroxide (1 g.) in carbon tetrachloride (500 ml.) were heated under reflux with exposure to a 750 watt lamp for 4.5 hours. The succinimide was filtered off, and the solvent removed under reduced pressure. The residue was dissolved in ether and washed with a 5% aqueous sodium bicarbonate solution. The residue obtained after drying and removal of the ether was fractionally distilled in vacuo. There was obtained 13.6 g. (48%) of 4 - bromo-3-bromomethylisothiazole, B.P. 100–106° (3 mm.).

4-bromo-3-cyanomethylisothiazole.—4 - bromo - 3 - bromomethylisothiazole (16.8 g., 0.654 mole) in dimethylsulfoxide (5 ml.) was added slowly to a stirred mixture of sodium cyanide (4 g., 0.0816 mole) and dimethylsulfoxide (20 ml.). The exothermic reaction necessitated some cooling. After one-half hour, the mixture was heated in a water bath at 40–50° for 3 hours. The reaction mixture was poured into ice-water (80 ml), and the organic material was extracted with methylene chloride (3× 50 ml.). The combined organic extracts were washed successively with 6 N hydrochloric acid (2×) and 5% aqueous sodium bicarbonate (1×). The methylene chloride solution was dried over magnesium sulfate with decolorizing carbon and filtered to give a red colored filtrate. The solvent was removed and the residue distilled in vacuo to give 3.55 g. of 4-bromo-3-cyanomethylisothiazole, B.P. 107–114° (0.5 mm.), which crystallized from benzene-hexane or ether-hexane as needles (32% yield), M.P. 47–49°. The infrared spectrum agreed with the expected structure.

Methyl 4-bromoisothiazol-3-yl-acetate.—A mixture of 4-bromo-3-cyanomethylisothiazole (3 g., 0.015 mole), methanol (10 ml.) and concentrated hydrochloric acid (10 ml.) was heated under reflux for 44 hours, whereafter most of the methanol was removed on a rotary evaporator. Ice-water (20 ml.) was added and the organic material was taken up in methylene chloride (4× 10 ml.). The combined methylene chloride solutions were dried over magnesium sulfate with some decolorizing carbon, followed by filtration. The solvent was removed and 3.3 g. (96%) of colorless liquid was obtained. The infrared spectrum agreed with the expected structure.

4-bromoisothiazol-3-yl-acetic acid.—Methyl 4 - bromoisothiazol-3-yl-acetate (3.28 g., 0.0139 mole) was dissolved in methanol (5 ml.) and the resulting solution was treated with 3 N methanolic sodium hydroxide (5 ml.). The sodium salt of the required acid readily crystallized. The mixture was left at room temperature for one hour, then most of the methanol was removed and ether (75 ml.) was added to the residue. The sodium salt was filtered off and amounted to 2.47 g. The sodium salt (2.47 g., 0.0101 mole) was dissolved in water (10 ml.) and this solution was acidified with 6 N aqueous hydrochloric acid. The product slowly crystallized from the solution in fine white needles. The mixture was cooled and the crystals collected by filtration. The acid, M.P. 106–107°, was finally dried in vacuo over phosphorous pentoxide and amounted to 1.983 g. The infrared spectrum, neutralization equivalent and nuclear magnetic resonance spectrum fully agreed with the expected structure.

Example 6.—Preparation of 3-methylisothiazol-4-yl-acetic acid 3-methylisothiazole - 4 - carbonyl chloride.—3-methylisothiazole-4-carboxylic acid (7.0 g.) and thionyl chloride (30 ml.) were heated unedr reflux for 3 hours, whereafter the excess of thionyl chloride was removed under reduced pressure. Distillation of the residue in vacuo gave 4.5 g. (80%) of 3-methylisothiazole-4-carbonyl chloride, B.P. 64° (2 mm.).

Methyl 3-methylisothiazol - 4 - yl-acetate.—The 3-methylisothiazole-4-carbonyl chloride (4.5 g.) was added to an ice-cold solution of three equivalents of diazomethane in ether. The solution was allowed to stand overnight at room temperature. The ether was removed and methanol (275 ml.) and some silver oxide were added to the residue. The mixture was heated under reflux for 5 hours. Small amounts of silver oxide were added periodically to the refluxing mixture. The solution was filtered through "Celite," the methanol removed and the residue distilled in vacuo to give 3 g. methyl 3-methyl-isothiazol-4-yl-acetate (50%), B.P. 89–91° (1 mm.).

3-methylisothiazol - 4 - yl-acetic acid.—Methyl 3-methylisothiazol - 4 - yl-acetate (3.0 g.) was added to 3 N methanolic sodium hydroxide (10 ml.) with swirling. The solution was left overnight at room temperature and then concentrated on a rotary evaporator. The solution was then extracted with ether (3× 25 ml.). The water solution was treated with charcoal, filtered through "Celite" and acidified with 3 M hydrochloric acid in an ice-water bath. The acid crystallized as a white powder and was filtered and dried in vacuo to give 2 g., M.P. 157–160°. Recrystallization from benzene gave 1.0 g. 3-methylisothiazol-4-yl-acetic acid, M.P. 159–161°. This compound had the expected neutralization equivalent, infrared spectrum and nuclear magnetic resonance spectrum.

Example 7.—Preparation of 3-methylisothiazol-5-yl-acetic acid 3-methylisothiazole-5-carbonyl chloride.—3-methylisothiazole-5-carboxylic acid (5.96 g.) and thionyl chloride (30 ml.) were heated under reflux for one and one-half hours, whereafter the excess of thionyl chloride was removed under reduced pressure. Distilation of the residue in vacuo gave 6.05 g. (93%) of 3-methylisothiazole-5-carbonyl chloride, b.p. 41–42° (0.5 mm.).

3 - methylisothiazole-5-diazomethylketone.—The acid chloride (6.05 g.) was added slowly to an ice-cold solution of 3 equivalents of diazomethane in ether (0.24 M) and the solution was left at room temperature overnight. Ether and excess diazomethane were removed under reduced pressure and the red residue was washed with hexane, filtered and recrystallized from benzene-hexane to give 3 g. of 3-methylisothiazole-5-diazomethylketone, M.P. 84–94°, with the expected infrarred spectrum.

Ethyl 3-methylisothiazol-5-yl-acetate.—3 - methylisothiazole-5-diazomethylketone (3.0 g., 0.018 mole) and absolute ethanol (50 ml.) were heated under reflux, with magnetic stirring, in a 300 ml. round-bottom flask (the inside of which had been coated with a silver mirror). A small amount (approximately 0.3 g.) of freshly prepared silver oxide was added. This resulted in an immediate evolution of gas. This gas evolution ceased after 10–15 minutes and the addition of some more silver oxide was required. The extent of the reaction could be followed by the disappearance in the infrared spectrum of the diazo band at 2100 cm.$^{-1}$ and the appearance of an ester carbonyl band at 1740 cm.$^{-1}$. The reaction was completed after 4 hours heating under reflux, and a total amount of approximately 3.0 g. of silver oxide was added during this reflux period. The ethanol was removed on a rotary evaporator. Ether (100 ml.) was added to the residue and the suspended solid material was filtered off. The ether solution was washed with 1 N hydrochloric acid (30 ml.), and salt water, whereafter it was dried over magnesium sulfate with some decolorizing carbon. The mixture was filtered and the ether removed on a rotary evaporator, to give 1.71 g. (51%) of ethyl 3-methylisothiazol-5-yl-acetate in the form of a red oil, with the expected infrared spectrum.

3-methylisothiazol-5-yl-acetic acid.—3 N methanolic sodium hydroxide (3.2 ml.) was added to ethyl 3-methylisothiazol-5-yl-acetate (1.71 g., 0.00925 mole). The solution was left overnight at room temperature and concentrated in vacuo. Dry ether was added and a thick oil and some solid separated; and the solid was filtered. Both the solid and oil were washed with ether, dissolved in water (20–25 ml.) and acidified with concentrated hydrochloric acid. A dark oil separated and was extracted with ethyl acetate (6× 20 ml.). The combined ethyl acetate extracts were dried over magnesium sulfate with some decolorizing carbon. The mixture was filtered, and the filtrate was concentrated on a rotary evaporator. Recrystallization of the residue from ethyl acetate-hexane gave 0.751 g. 3-methylisothiazol-5-yl-acetic acid, M.P. 135–138° (dec.). The neutralization equivalent, infrared spectrum and nuclear magnetic resonance spectrum were in agreement with the expected structure.

Example 8

When in the procedure of Example 6, 3-methylisothiazole-4-carboxylic acid is replaced by an equimolar amount of 4-methylisothiazole-3-carboxylic acid
5-methylisothiazole-3-carboxylic acid
4-methylisothiazole-5-carboxylic acid
3,4-dimethylisothiazole-5-carboxylic acid
4-chloro-3-methylisothiazole-5-carboxylic acid
4-iodo-3-methylisothiazole-5-carboxylic acid
4-bromo-3-methylisothiazole-5-carboxylic acid
5-methylisothiazole-4-carboxylic acid
3-chloroisothiazole-4-carboxylic acid
3-chloro-4-methylisothiazole-5-carboxylic acid
4-chloro-5-methylisothiazole-3-carboxylic acid and
3,5-dimethylisothiazole-4-carboxylic acid there are obtained 4-methylisothiazol-3-yl-acetic acid
5-methylisothiazol-3-yl-acetic acid
4-methylisothiazol-5-yl-acetic acid
3,4-dimethylisothiazol-5-yl-acetic acid
4-chloro-3-methylisothiazol-5-yl-acetic acid
4-iodo-3-methylisothiazol-5-yl-acetic acid
4-bromo-3-methylisothiazol-5-yl-acetic acid
5-methylisothiazol-4-yl-acetic acid
3-chloroisothiazol-4-yl-acetic acid
3-chloro-4-methylisothiazol-5-yl-acetic acid
4-chloro-5-methylisothiazol-3-yl-acetic acid and
3,5-dimethylisothiazol-4-yl-acetic acid respectively.

Example 9

When in the procedure of Example 4, 4-chloro-3-methylisothiazole is replaced by an equimolar amount of 4-iodo-3-methylisothiazole
4-chloro-5-methylisothiazole
4-bromo-5-methylisothiazole
4-iodo-5-methylisothiazole
5-bromo-3-methylisothiazole
4,5-dibromo-3-methylisothiazole
3-chloro-5-methylisothiazole 3-bromo-5-methylisothiazole and
3,4-dichloro-5-methylisothiazole there are obtained 4-iodoisothiazol-3-yl-acetic acid
4-chloroisothiazol-5-yl-acetic acid
4-bromoisothiazol-5-yl-acetic acid
4-iodoisothiazol-5-yl-acetic acid
5-bromoisothiazol-3-yl-acetic acid
4,5-dibromoisothiazol-3-yl-acetic acid
3-chloroisothiazol-5-yl-acetic acid
3-bromoisothiazol-5-yl-acetic acid and
3,4-dichloroisothiazol-5-yl-acetic acid respectively.

Example 10.—Preparation of p-nitrophenyl isothiazol-3-yl-acetate

Isothiazol-3-yl-acetic acid (13.0097 g., 0.091 mole) and p-nitrophenol (13.281 g., 0.095 mole) were dissolved in dry dioxane (300 ml.) and the solution cooled in an ice bath. N,N'-dicyclohexylcarbodiimide (18.773 g., 0.091 mole) was added and the solution shaken well and left at room temperature overnight. The precipitated urea was removed by filtration and washed with dry dioxane and dry ether. The filtrate and washings were combined and concentrated in vacuo at room temperature, leaving a residue containing the active ester which crystallized on scratching. The ester was washed with hexane, dissolved in ether and concentrated in vacuo. The residue was recrystallized from methanol and water to give 16.0 g. of p-nitrophenyl isothiazol-3-yl-acetate, m.p. 82–85°.

Example 11.—Preparation of potassium-6-(isothiazol-3-yl-acetamido)penicillanate 6-aminopenicillanic acid (13.1 g., 0.0606 mole) and triethylamine (12.24 g., 0.1212 mole) were shaken with methylene chloride (120 ml.) until the mixture was homogeneous. The mixture was cooled in an ice bath and p-nitrophenyl isothiazol-3-yl-acetate (16.0 g., 0.0606 mole) added with shaking and the resulting solution left at room temperature. The course of the reaction was followed by periodically obtaining an infrared spectrum of the mixture and comparing the relative intensities of the bands at about 1770, 1690 and 1600 cm.$^{-1}$ due to the $\beta$-lactam, amide and carboxylate. The reaction mixture was kept at room temperature for 3 hours and placed in the refrigerator overnight. Excess dry ether was added to the mixture and the triethylamine salt of 6-(isothiazol-3-yl-acetamido) penicillanic acid precipitated. The precipitated salt was filtered and dried and weighed 24.3 g. The salt was dissolved in the minimum of dry methanol and a solution of potassium 2-ethylhexanoate in n-butanol (2.5 M., 25 ml.) added with shaking. Potassium 6-(isothiazol-3-yl-acetamido)-penicillanate separated as a solid when ether was added. The precipitate was collected by filtration and washed with ether, then dissolved in methanol, filtered and reprecipitated with ether. The precipitate was filtered, washed with ether and dried in vacuo and found to weigh 20.0 g. The product, potassium 6-(isothiazol-3-yl-acetamido)penicillanate, was found to contain the $\beta$-lactam structure as shown by infrared analysis and to inhibit *Staph. aureus* Smith at 0.016 mcg./ml., to inhibit *Salmonella enteritidis* at 0.8 to 1.6 mcg./ml. and to exhibit versus *Staph. aureaus Smith* and *Salmonella enteritidis* in mice a CD$_{50}$ of 1.0 mgm./kg. and 9.0 mgm./kg. respectively, upon intramuscular injection, and a CD$_{50}$ of 1.8 mgm./kg. and 28 mgm./kg. respectively, upon oral administration.

Example 12—Preparation of p-nitrophenyl isothiazol-4-yl-acetate

Isothiazol-4-yl-acetic acid (0.7179 g., 0.005 mole) and p-nitrophenol (0.6980 g., 0.005 mole) were dissolved in dry dioxane (20 ml.) and the solution cooled in an ice-bath. N,N'-dicyclohexylcarbodiimide (1.030 g., 0.005 mole) was added and the solution shaken well and left at room temperature overnight. The precipitated urea was removed by filtration and washed with dry dioxane (2× 2 ml.) and dry ether (3× 3 ml.). The filtrate and washings were combined and concentrated in vacuo at room temperature, leaving the active ester as a thick yellow wax which crystallized on scratching as fine light yellow needles. The needles were washed with hexane, dried in vacuo and then washed with ether and hexane and dried over phosphorous pentoxide under high vacuum to give p-nitrophenyl isothiazol-4-yl-acetate, weight, 1.142 g., M.P. 73–75°.

Example 13.—Preparation of potassium 6-(isothiazol-4-yl-acetamido)penicillanate 6-aminopenicillanic acid (0.864 g., 0.004 mole) and triethylamine (0.808 g., 0.008 mole) were shaken with methylene chloride (10 ml.) until the mixture was homogeneous. The mixture was cooled in an ice-bath and p-nitrophenyl isothiazol-4-yl-acetate (1.056 g., 0.004 mole) was added with shaking and the resulting solution left at room temperature. The course of the reaction was followed by periodically obtaining an infrared spectrum of the mixture and comparing the relative intensities of the bands at about 1770, 1690 and 1600 cm.$^{-1}$ due to the $\beta$-lactam, amide and carboxylate. After one-half hour the mixture was concentrated in vacuo and triethylamine (1 ml.) and methylene chloride (3 ml.) added and left overnight at room temperature. Excess ether was added and a yellow wax separated, which was separated and washed with ether. The wax was dissolved in the minimum of dry methanol and a solution of potassium 2-ethyl-hexanoate in n-butanol (2.5 M., 2 ml.) added with shaking followed by ether with scratching and potassium 6-(isothiazol-4-yl-acetamido)penicillanate separated as a solid. The solid was collected by filtration and washed with ether, then dissolved in methanol and reprecipitated with ether and dried over phosphorous pentoxide for 24 hours. The potassium 6-(isothiazol-4-yl-acetamido)penicillanate obtained weighed 1.147 g.

The product, potassium 6-(isothiazol-4-yl-acetamido)-penicillanate was found to contain the $\beta$-lactam structure as shown by infrared analysis and to inhibit *Staph. aureus* Smith at 0.031 mcg./ml., to inhibit *Salmonella enteritidis* at 0.125 to 0.4 mcg./ml., to inhibit *E. coli* at 12.5 mcg./ml. and to exhibit versus *Staph. aureus* Smith, *Salmonella enteritidis* and *Klebsiella pneumoniae* in mice a CD$_{50}$ of 0.35 mgm./kg., 9.0 mgm./kg. and 45 mgm./kg., respectively, upon intramuscular injection and a CD$_{50}$ of 0.64 mgm./kg., 22 mgm./kg. and 225 mgm./kg., respectively, upon oral administration.

Example 14.—Preparation of p-nitrophenyl isothiazol-5-yl-acetate

To a cold solution of isothiazol-5-yl-acetic acid (1.43 g., 0.010 mole) and p-nitrophenol (1.67 g., 0.012 mole) in anhydrous dioxane (20 ml.) was added N,N'-dicyclohexylcarbodiimide (2.06 g., 0.010 mole). The reaction mixture was allowed to stand at room temperature for one hour, whereafter the N,N'-dicyclohexylurea was filtered off and washed with ethyl acetate (20 ml.). The combined filtrate (reddish colored) and washings were treated with decolorizing carbon and filtered. As the solution was still highly colored the treatment with decolorizing carbon was repeated. The solvent was removed in vacuo and the residue was recrystallized from a 1:1 mixture of ether-petroleum ether to give 1.32 g. (50%) of yellow colored, solid p-nitrophenyl isothiazol-5-yl-acetate, M.P. 76–80° C.

Example 15.—Preparation of potassium 6-(isothiazol-5-yl-acetamido)penicillanate 6-aminopenicillanic acid (1.08 g., 0.005 mole) was dissolved in methylene chloride (10 ml.) containing triethylamine (1.01 g., 0.010 mole) by shaking at room temperature over a period of one hour. The solution was then cooled in ice and p-nitrophenyl isothiazol-5-yl-acetate (1.31 g., 0.005 mole) was added. The reaction mixture (which became highly colored) was left at 0° C. for one hour, then the mixture was left at room temperature for 4 hours for completion of the reaction. The reaction was followed by measuring the intensity of the amide absorption band at 1675 cm.$^{-1}$ in the infrared spectrum. A small amount of highly colored insoluble material was filtered off. The addition of ether (10 ml.) precipitated the triethylamine salt of the penicillanic acid as a viscous oil that readily solidified. The solid was washed several times with ether (4× 20 ml.) by decantation. The potassium salt of the penicillanic acid was prepared by disolving the triethylamine salt in methanol (2 ml.), adding a 2.5 M. solution of potassium 2-ethylhexanoate in n-butanol (2 ml.) followed by dry ether (10 ml.). The potassium salt of 6-(isothiazol-5-yl-acetamido)penicillanic acid was twice recrystallized from a methanol-ether mixture to give 1.25 g. (66%) of brownish colored solid.

The product, potassium 6-(isothiazol-5-yl-acetamido)-penicillanate, was found to contain the β-lactam structure as shown by infrared analysis and to inhibit *Staph. aureus* Smith at 0.016 mcg./ml., to inhibit *Salmonella enteritidis* at 0.125 to 0.4 mcg./ml., to inhibit *E. coli* at 12.5 mcg./ml. and to exhibit versus *Staph. aureus* Smith, *Salmonella enteritidis* and *Klebsiella pneumoniae* in mice a $CD_{50}$ of 0.6 mgm./kg., 9.0 mgm./kg. and 22.5 mgm./kg. respectively, upon intramuscular injection and a $CD_{50}$ of 1.8 mgm./kg., 19 mgm./kg. and 135 mgm./kg. respectively, upon oral administration.

Example 16.—Preparation of p-nitrophenyl-4-chloro-isothiazol-3-yl-acetate 4-chloroisothiazol-3-yl-acetic acid (0.266 g., 0.0015 mole) and p-nitrophenol (0.250 g., 0.0018 mole) were dissolved in ethyl acetate (5 ml.) and the solution cooled in an ice bath. N,N-dicyclohexylcarbodiimide (0.309 g., 0.0015 mole) was added and N,N'-dicyclohexylurea precipitated readily. The reaction mixture was left at room temperature for one hour. The precipitated urea was removed by filtration and the filtrate concentrated in vacuo. Addition of petroleum ether caused p-nitrophenyl-4-chloro-isothiazol-3-yl-acetate to precipitate. Yield: 0.31 g. (70%) of pale brown crystals, M.P., 93–97°.

Example 17.—Preparation of potassium 6-(4-chloroisothiazol-3-yl-acetamido)penicillanate A. 6-aminophenicillanic acid (0.216 g., 0.001 mole) and triethylamine (0.202 g., 0.002 mole) were shaken with methylene chloride (5 ml.) until the mixture was homogeneous. The mixture was cooled in an ice bath to 0° C. and p-nitrophenyl-4-chloroisothiazol--3-yl-acetate (0.299 g., 0.001 mole) added with shaking and the resulting solution left at room temperature for 20 hours.

B. 6-aminopenicillanic acid (1.49 g., 0.0069 mole) and thiethylamine (1.39 g., 0.138 mole) were shaken with methylene chloride (14 ml.) until the mixture was homogeneous. The mixture was cooled in an ice bath to 0° and p-nitrophenyl-4-chloroisothiazol-3-yl-acetate (2.05 g., 0.0069 mole) added with shaking and the resulting solution left at room temperature for 16 hours.

After completion of the reactions, A and B were combined and the addition of excess dry ether precipitated the triethylamine salt of 6-(4-chloroisothiazol-3-yl-acetamido)penicillanic acid. The salt was dissolved in methylene chloride and reprecipitated with ether and then dissolved in the minimum of dry methanol. A solution of potassium 2-ethylhexanoate in n-butanol (2.5 M., 4 ml.) was added with shaking followed by the addition of ether which precipitated potassium 6-(4-chloro-isothiazol - 3 - yl - acetamido)penicillanate. The penicillin was recrystallized 3 times by dissolving in methanol followed by addition of ether with scratching. The collected precipitate was dried over phosphorous pentoxide for 24 hours to give 2.21 g. of white non-hygroscopic solid, potassium 6-(4-chloroisothiazol-3-yl-acetamido)penicillanate.

The product, potassium 6-(4-chloroisothiazol-3-yl-acetamido)penicillanate, was found to contain the β-lactam structure as shown by infrared analysis and to inhibit *Staph. aureus* Smith at 0.016 mcg./ml. and to inhibit *Salmonella enteritidis* at 3.1. mcg./ml.

Example 18.—Preparation of 2,4-dinitrophenyl-3-methyl-isothiazol-4-yl-acetate 3-methylisothiazol-4-yl-acetate acid (0.315 g) and 2,4-dinitrophenol (0.374 g.) were dissolved in dioxane (10 ml.) and the solution cooled in an ice-bath. N,N'-dicyclohexylcarbodiimide (0.414 g.) was added and the solution shaken well and left in an ice-bath for one-half hour and then at room temperature for 4 hours. The precipitated urea was removed by filtration and washed with dioxane (4× 2 ml.) and dry ether (2× 5 ml.). The filtrate and washings were combined and concentrated in vacuo at room temperature leaving the ester as a yellow oil. The oil was mixed with ether, extracted with water, dried over magnesium sulfate, filtered and concentrated. A solid crystallized and was separated by filtration, washed with ether and petroleum ether and dried in vacuo. 2,4-dinitrophenyl-3-methylisothiazol-4-yl-acetate, 0.522 g., M.P. 80–81° was obtained.

Example 19.—Preparation of potassium 6-(3-methyl-isothiazol-4-yl-acetamido)penicillanate 6-aminopenicillanic acid (2.422 g.) and triethylamine (1.52 g.) were shaken with methylene chloride (20 ml.) until the mixture was homogeneous. The mixture was cooled in an ice-bath and 2,4-dinitrophenyl-3-methyl-isothiazol-4-yl-acetate (2.242 g.) added with shaking and the resulting solution left in the ice-bath for one-half hour for completion of the reaction. The addition of dry ether with scratching precipitated the triethylamine salt of 6-(3-methylisothiazol-4-yl-acetamido) penicillanic acid as an oil. Reprecipitation from methylene chloride with ether gave the salt as a solid. The salt was dissolved in the minimum of dry methanol and a solution of potassium 2-ethylhexanoate in n-butanol (2.5 M., 3 ml.) added with shaking, followed by ether. The potassium salt was twice recrystallized from methanol-ether to give 2.34 g. of potassium 6 - (3 - methylisothiazol - 4 - yl - acetamido)penicillanate.

The product, potassium 6-(3-methylisothiazol-4-yl-acetamido)penicillanate, was found to contain the β-lactam structure as shown by infrared analysis and to inhibit *Staph. aureus* Smith at 0.062 mcg./ml. and to inhibit *Salmonella enteritidis* at 0.4 to 0.8 mcg./ml.

Example 20.—Preparation of p-nitrophenyl-3-methyl-isothiazol-5-yl-acetate 3-methylisothiazol-5-yl-acetic acid (0.628 g., 0.004 mole) and p-nitrophenol (0.556 g., 0.004 mole) were dissolved in dry dioxane (15 ml.) and the solution cooled in an ice-bath. N,N'-dicyclohexylcarbodiimide (0.824 g., 0.004 mole) was added and the solution shaken well and left at room temperature for 4 hours. Charcoal was added and the precipitated urea was removed by filtration and washed with dioxane (3× 2 ml.) and dry ether (3× 2 ml.). The filtrate and washings were combined and concentrated in vacuo at room temperature leaving the active ester as a thick wax. The wax was washed with dry ether and hexane and dried thoroughly over potassium pentoxide under high vacuum. p-Nitrophenyl-3-methylisothiazol-5-yl-acetate was obtained as a brown solid, 0.864 g., M.P. 55°.

Example 21.—Preparation of 6-(3-methylisothiazol-5-yl-acetamido)penicillanate p-Nitrophenyl 3-methylisothiazol-5-yl-acetate (0.834 g., 0.003 mole) was added to an ice-cold, almost homogeneous, solution of 6-aminopenicillanic acid (0.648 g., 0.003 mole) and triethylamine (0.606 g., 0.006 mole) in methylene chloride (5 ml.). The progress of the reaction was followed from the relative intensities of the β-lactam and amide bands in the infrared absorption spectrum of the mixture. After two hours the reaction was complete and the reaction mixture was a clear brown solution. Excess dry ether was added, causing the triethylamine salt of the penicillin to separate as a brown viscous oil. The supernatant liquid was decanted and the residual wax washed well with ether. The wax was dissolved in the minimum amount of methanol and a 2.5 M. solution of potassium 2 ethyl-hexanoate in n-butanol (1.2 ml.) was added. Dry ether was added in small amounts with scratching, causing a yellow solid to separate. Excess ether was added and the solid filtered and washed with ether. The solid was dissolved in the minimum amount of methanol and reprecipitated with ether, filtered and dried for 24 hours over $P_2O_5$ in vacuo. The potassium 6-(3-methylisothiazol-5-yl-acetamido)penicillanate obtained weighed 0.5 g.

The product, potassium 6-(3-methylisothiazol-5-yl-acetamido)penicillanate, was found to contain the β-lactam structure as shown by infrared analysis and to inhibit Staph. aureus Smith at 0.016 mcg./ml., to inhibit Salmonella enteritidis at 0.8 mcg./ml. and to exhibit versus Staph. aureus Smith in mice a $CD_{50}$ of 0.19 mgm./kg. upon intramuscular injection and a $CD_{50}$ of 0.88 mgm./kg. upon oral administration.

Example 22.—Preparation of 2.4-dinitrophenyl-4-bromo-isothiazol-3-yl-acetate 4-bromoisothiazol-3-yl-acetic acid (0.222 g.) and 2,4-dinitrophenol (0.184 g.) were dissolved in ethyl acetate (6 ml.) and the solution cooled in an ice-bath. N,N'-dicyclohexylcarbodiimide (0.206 g.) was added and the solution shaken well and left at room temperature for 1 hour. The precipitated urea was removed by filtration and washed with dry ether. The filtrate and washings were combined and concentrated in vacuo at room temperature. Ethyl acetate was added, the mixture cooled in an ice-bath and Skellysolve B added slowly with stirring. The light yellow precipitate, 2,4-dinitrophenyl-4-bromoisothiazol-3-yl-acetate, was filtered and dried and found to weigh 0.320 g. and have an M.P. of 88–90°.

Example 23.—Preparation of Potassium 6-(4-bromo isothiazol-3-yl-acetamido)penicillanate 6-aminopenicillanic acid (1.296 g.) and triethylamine (1.515 g.) were shaken with methylene chloride (12 ml.) until the mixture was homogeneous. The mixture was cooled in an ice-bath and 2,4-dinitrophenyl-4-bromoisothiazol-3-yl-acetate (2.328 g.) was added with shaking and the resulting solution left at room temperature overnight for completion of the reaction. The reaction was followed by measuring the intenseity of the amide absorption band at 1675 cm.$^{-1}$ in the infrared spectrum. The addition of dry ether with scratching precipitated the triethylamine salt of 6-(4-bromoisothiazol-3-yl-acetamido)penicillanic acid as a yellow wax which was washed three times with ether by decantation. The wax was dissolved in the minimum of dry methanol and a solution of potassium 2-ethylhexanoate in n-butanol (2.5 M., 4.8 ml.) added with shaking followed by ether with scratching when the potassium salt separated as a solid. It was collected by filtration, washed with ether, recrystallized from methanol (15 ml.) with ether and dried to give 1.841 g. of potassium 6-(4-bromoisothiazol-3-yl-acetamido)penicillanate.

The product, potassium 6-(4-bromoisothiazol-3-yl-acetamido)penicillanate, was found to contain the β-lactam structure as shown by infrared analysis and to inhibit Staph. aureus Smith at a concentration of 0.001 percent by weight.

Example 24

When in the procedure of Example 15, p-nitro-phenyl isothiazol-5-yl-acetate is replaced by an equimolar amount of the p-nitrophenyl ester of 4-methylisothiazol-3-yl-acetic acid,
4-methylisothiazol-5-yl-acetic acid.
3,4-dimethylisothiazol-5-yl-acetic acid,
3-chloroisothiazol-5-yl-acetic acid,
4-chloroisothiazol-5-yl-acetic acid,
3-bromo-isothiazol-5-yl-acetic acid,
4-bromo-isothiazol-5-yl-acetic acid,
3-chloro-4-methylisothiazol-5-yl-acetic acid,
3-chloroisothiazol-4-yl-acetic acid,
5-methylisothiazol-4-yl-acetic acid,
5-methylisothiazol-3-yl-acetic acid,
3,4-dichloroisothiazol-5-yl-acetic acid,
4-chloro-5-methylisothiazol-3-yl-acetic acid,
3,5-dimethylisothiazol-4-yl-acetic acid,
4-chloro-3-methylisothiazol-5-yl-acetic acid,
4-bromo-3-methylisothiazol-5-yl-acetic acid,
4-iodo-3-methylisothiazol-5yl-acetic acid,
4-iodoisothiazol-5-yl-acetic acid,
4-iodoisothiazol-3-yl-acetic acid,
5-bromoisothiazol-3-yl-acetic acid, and
4,5-dibromoisothiazol-3-yl-acetic acid, respectvely, there are obtained the potassium salts of 6-(4-methylisothiazol-3-yl-acetamido)penicillanic acid,
6-(4-methylisothiazol-5-yl-acetamido)penicillanic acid,
6-(3,4-dimethylisothiazol-5-yl-acetamido)penicillanic acid,
6-(3-chloroisothiazol-5-yl-acetamido)pencillanic acid,
6-(4-chloroisothiazol-5-yl-acetamido)penicillanic acid,
6-(3-bromo-isothiazol-5-yl-acetamido)penicillanic acid,
6-(4-bromo-isothiazol-5-yl-acetamido)penicillanic acid,
6-(3-chloro-4-methylisothiazol-5-yl-acetamido)penicillanic acid,
6-(3-chloroisothiazol-4-yl-acetamido)penicillanic acid,
6-(5-methylisothiazol-4-yl-acetamido)penicillanic acid,
6-(5-methylisothiazol-3-yl-acetamido)penicillanic acid,
6-(3,4-dichloroisothiazol-5-yl-acetamido)penicillanic acid,
6-(4-chloro-5-methylisothiazol-3-yl-acetamido)penicillanic acid,
6-(3,4-dimethylisothiazol-4-yl-acetamido)penicillanic acid,
6-(4-chloro-3-methylisothiazol-5-yl-acetamido)pencillanic acid,
6-(4-bromo-3-methylisothiazol-5-yl-acetamido)penicillanic acid,
6-(4-iodo-3-methylisothiazol-5-yl-acetamido)penicillanic acid,
6-(4-iodoisothiazol-5-yl-acetamido)penicillanic acid,
6-(4-iodoisothiazol-3-yl-acetamido)penicillanic acid,
6-(5-bromoisothiazol-3-yl-acetamido)penicillanic acid, and
6-(4,5-dibromoisothiazol-3-yl-acetamido)penicillanic acid, respectively, each of which is isolated as its water-soluble potassium salt and found to contain the β-lactam structure as shown by infrared analysis and to inhibit Staph. aureus Smith at a concentration of 0.001% by weight.

Example 25

Fermentation Media I through VI were prepared, each of said media consisting of, on a weight basis, 7.5% lactose, 4% purified cottonseed meal, 1% calcium carbonate, 0.5% calcium sulfate, 0.4% sodium sulfate, 1% lard oil in water and a precursor as hereinafter indicated in the case of Media II through VI. Medium I contained no precursor, while Medium II contained, in addition to the ingredients which are common to Media I through VI, 0.5% of a 64% aqueous solution of the potassium salt of phenylacetic acid. Media III, IV, V and VI contained 0.05%, 0.1%, 0.5% and 1.0%, respectively, of isothiazol-5-yl-acetic acid. Each of the foregoing media were autoclaved (20 minutes at 15 pounds per square inch pressure), inoculated with Penicillium chrysogenum and aerobically fermented for 9 days at 74° F. Samples for analysis were removed from each media and centrifuged on the ninth day and assayed. The supernatant liquid from each was adjusted to a concentration of 1000 mcg. A 1 ml. sample of the adjusted supernatant liquid from each was mixed with 9 ml. of pH 1.8, 0.1 M. KCl-HCl buffer and allowed to stand at 37° C. in a water bath for 17 minutes. One ml. of each sample was mixed with 1 ml. 0.3 M., pH 8 potassium phosphate buffer. The samples were diluted 10 times with pH 7.0, 0.1 M. phosphate buffer and then assayed by the filter plate disc method against *B. subtilis*.

The results of the assays on both the untreated broth and acid-treated broth as taken from the fermentation medium on the ninth day are set forth below in Table A:

TABLE A

| Media | Precursor | Initial Concentration of Precursor in Media, Percent | Bioassay in mcg. penicillin per ml. | |
|---|---|---|---|---|
| | | | 9th Day | 9th Day Acid Treated |
| I | None (control) | 0.0 | 400 | <40 |
| II | 64% aqueous solution of potassium salt of phenylacetic acid. | 0.5 | 3,080 | <140 |
| III | Isothiazol-5-yl-acetic acid | 0.05 | 920 | 660 |
| IV | do | 0.1 | 1,180 | 880 |
| V | do | 0.5 | 1,520 | 960 |
| VI | do | 1.0 | 2,040 | 1,320 |

It can be seen from the foregoing data of Table A that the penicillin produced from Media I and II, i.e. in the absence of the novel precursors described herein, assays at 400 and 3080 mcg./ml. respectively, before acid treatment but that after acid treatment to remove acid-unstable penicillins the assay shows insignificant activity, i.e. only <40 and <140 mcg./ml. respectively. In the production of penicillins, as shown above, wherein isothiazol-5-yl-acetic acid was incorporated in the media in the above-stated quantities, there was produced a significant amount of the acid-stable penicillin 6-(isothiazol-5-yl-acetamido) penicillanic acid.

Example 26

The filtered broth obtained from fermentation Media III, IV, V and VI of Example 25 is treated with acid to remove acid-unstable penicillins, dialyzed through a cellophane membrane against distilled water to remove the inorganic salts and freeze-dried under vacuum to produce 6-(isothiazol-5-yl-acetamido)penicillanic acid.

What is claimed is:
1. A member selected from the group consisting of compounds of the formula

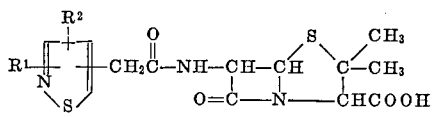

wherein $R^1$ and $R^2$ each represent a member selected from the group consisting of hydrogen, chloro, bromo, iodo and methyl; and the pharmaceutically acceptable nontoxic salts thereof.

2. A member selected from the group consisting of compounds of the formula

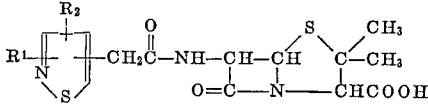

wherein $R^1$ and $R^2$ each represent a member selected from the group consisting of hydrogen and methyl.

3. A compound having the formula

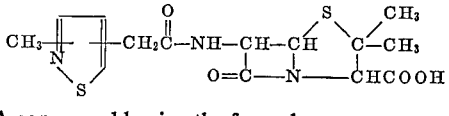

4. A compound having the formula

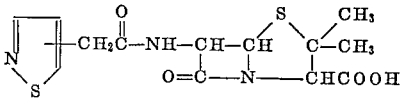

5. 6-(isothiazol-5-yl-acetamido)penicillanic acid.
6. 6-(isothiazol-4-yl-acetamido)penicillanic acid.
7. 6-(isothiazol-3-yl-acetamido)penicillanic acid.
8. 6-(4-chloroisothiazol-3-yl-acetamido)penicillanic acid.
9. 6-(4-bromoisothiazol-3-yl-acetamido)penicillanic acid.
10. 6-(3-methylisothiazol-4-yl-acetamido)penicillanic acid.
11. 6-(3-methylisothiazol-5-yl-acetamido)penicillanic acid.
12. 6-(4-methylisothiazol-5-yl-acetamido)penicillanic acid.

No references cited.

NICHOLAS S. RIZZO, Primary Examiner

U.S. Cl. X.R.
260—302; 424—271